(12) United States Patent
Conti

(10) Patent No.: US 7,562,633 B2
(45) Date of Patent: Jul. 21, 2009

(54) OCEAN-GOING VESSELS

(75) Inventor: Ugo Conti, El Cerrito, CA (US)

(73) Assignee: Marine Advanced Research, Inc., El Cerrito, CA (US)

( * ) Notice: Subject to any disclaimer, the term of this patent is extended or adjusted under 35 U.S.C. 154(b) by 419 days.

(21) Appl. No.: 11/270,285

(22) Filed: Nov. 9, 2005

(65) Prior Publication Data

US 2006/0249066 A1 Nov. 9, 2006

Related U.S. Application Data

(60) Provisional application No. 60/626,318, filed on Nov. 9, 2004.

(51) Int. Cl.
 *B63B 1/10* (2006.01)
 *B63B 1/14* (2006.01)
 *B63B 7/08* (2006.01)
 *B60K 15/063* (2006.01)
 *B60K 15/073* (2006.01)

(52) U.S. Cl. ............... 114/61.1; 114/61.15; 114/61.25; 220/562; 220/905

(58) Field of Classification Search ............. 114/61.1, 114/61.25, 74 R, 74 T, 74 A, 256, 257, 345, 114/61.15; 220/560, 562–564, 9.1–9.4, 905
See application file for complete search history.

(56) References Cited

U.S. PATENT DOCUMENTS 3,978,901 A * 9/1976 Jones ..................... 206/524.5
5,282,437 A * 2/1994 Avillez de Basto .......... 114/345
5,794,559 A * 8/1998 Graham ..................... 114/343
6,178,911 B1 1/2001 Hemphill et al.
6,789,490 B2 9/2004 Schmidt
6,874,439 B2 4/2005 Conti

FOREIGN PATENT DOCUMENTS

| DE | 2411229 A | * | 9/1975 |
| FR | 2203349 | | 5/1974 |
| FR | 2203349 A | * | 6/1974 |
| FR | 2259742 A | * | 10/1975 |
| GB | 194806 | | 3/1923 |
| GB | 0194806 | * | 3/1923 |

OTHER PUBLICATIONS

Burgess, Richard R., "Lockheed Martin Expands Missions for Littoral Craft Concept", Sea Power, Nov. 2004, pp. 24-25.

* cited by examiner

*Primary Examiner*—Ajay Vasudeva
(74) *Attorney, Agent, or Firm*—Blakely Sokoloff Taylor & Zafman LLP

(57) ABSTRACT

Ocean-going vessels having a load carrying module supported from a pair of spaced apart hulls by legs. The legs may be articulated in two places to provide control of the spacing of the two hulls and to control the elevation of the module off the water. Dynamic control of the articulation may control the response of the vessel, such as to sea conditions. The legs may include aerodynamic surfaces, fixed or controllable, that may be used to aide buoyancy and/or enhance stability, such as by assuring the bow of the hulls does not rise excessively. The hulls preferably are at least partially inflatable, with techniques for installing flexible fuel tanks within a preexisting inflatable hull being disclosed. Also disclosed are modular pressure control systems for controlling pressures in inflatable hulls having a multiplicity of separate inflatable compartments.

21 Claims, 13 Drawing Sheets

OCEAN-GOING VESSELS

CROSS-REFERENCE TO RELATED APPLICATION

This application claims the benefit of U.S. Provisional Patent Application No. 60/626,318 filed Nov. 9, 2004.

BACKGROUND OF THE INVENTION

1. Field of the Invention

The present invention relates to the field of marine vessel design.

2. Prior Art

The present invention relates to improvements in "Flexible Ocean-Going Vessels with Surface Conforming Hulls" disclosed in U.S. Pat. No. 6,874,439. That invention provides the fundamentals for the design of an entirely different type of vessel that creates the minimum possible disruption of the waves. In other words, the vessel does not push, slap or pierce the waves but instead "dances" with them.

That invention utilizes flexibility to change and adjust the vessel's structure and form to the water surface, instead of adjusting or changing the water to conform to the vessel. This method of adjusting the shape of the structure in motion to a fixed surface is used in skis that must follow the variation of the snow surface and absorb the shocks involved with moving over that surface at high speed. The vessel has a pair of flexible hulls flexibly coupled to a "cabin" between and above the hulls, thereby allowing the hulls to independently follow the surface of the water. Motor pods are hinged to the back of the hulls to maintain the propulsion system in the water, even if the stern of one or both hulls tends to lift out of the water when crossing swells and the like. The primary hulls disclosed are inflatable hulls, typically multi-compartment hulls for safety reasons. Various other embodiments and features are disclosed in that patent.

U.S. Pat. No. 6,178,911 discloses a method to connect the independent compartments of an inflatable boat with a pumping system, with valves between the chambers that can be opened to connect adjacent compartments or closed to isolate them. This invention relates to an automatically inflatable boat formed by a deck and separate inflatable compartments attached to the deck. An air pump is located on deck and is in fluid communication with the various compartments.

Another prior art vessel is Lockheed Martin's Covert Highspeed Attack & Reconnaissance Craft (CHARC) described and shown in the November 2004 issue of *Sea Power*. As described therein, "The craft's upper hull is connected by two strut-like middle hull sections to two 5-foot-diameter pods in a catamaran-like configuration, a manifestation of the SWATH technology used in the Sea Slice demonstration craft. The upper hull structure to the rear of the cockpit is available for transporting special operations troops or modular mission payloads. The pods house the propulsion systems and compartments to carry mission systems such as antisubmarine torpedoes, inflatable rubber boats or autonomous underwater vehicles." Unlike the vessels in accordance with U.S. Pat. No. 6,874,439, there is one middle hull section on each side of the craft, each being a two section strut-like structure, with the pods being rigid. The pods are equipped with wheels for taxiing or parking on shore, and are intended to be totally submerged for high-speed operation, using fins for stability and control.

DETAILED DESCRIPTION OF THE PREFERRED EMBODIMENTS

Figure 1A:
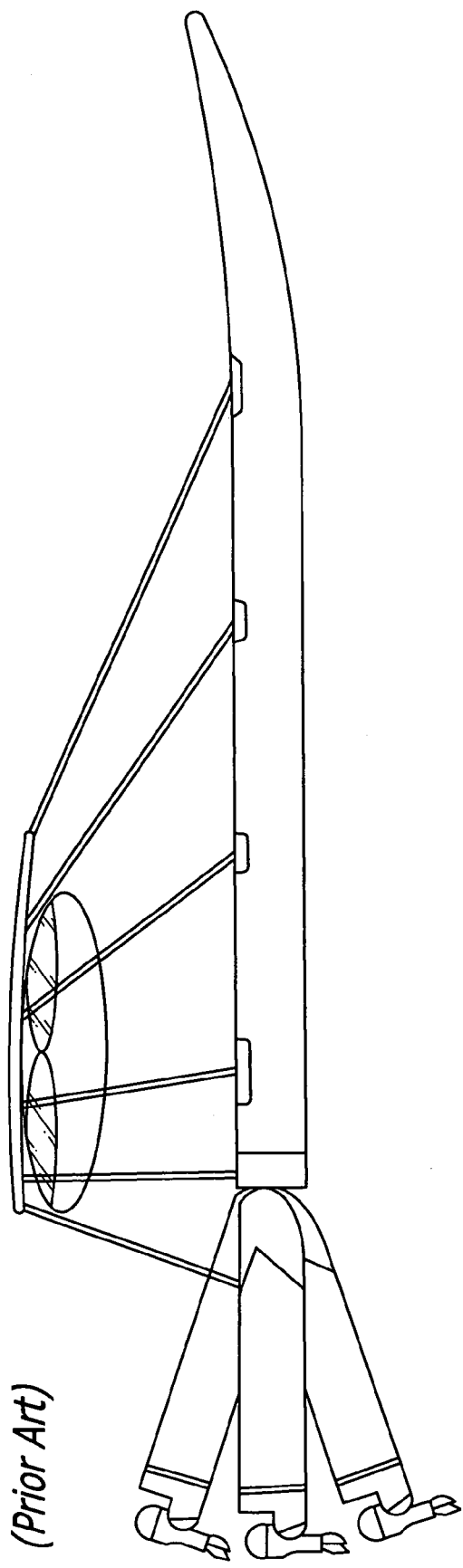
FIGS. 1A through 1C depict one embodiment of a vessel in accordance with U.S. Pat. No. 6,874,439 on which the present invention may be used.
Figure 1C:
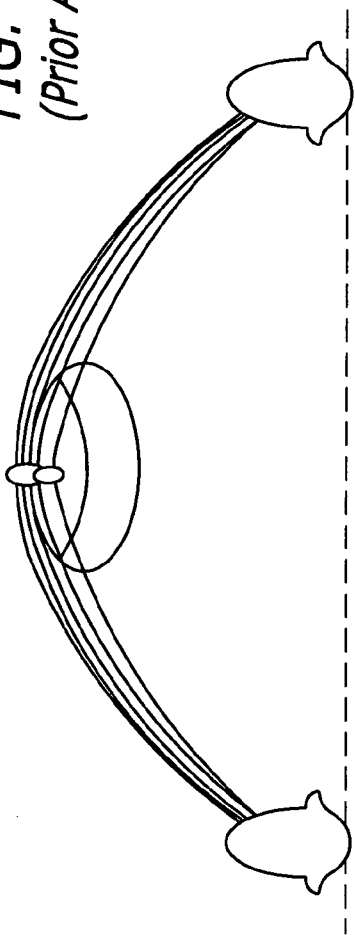
Figure 1B:
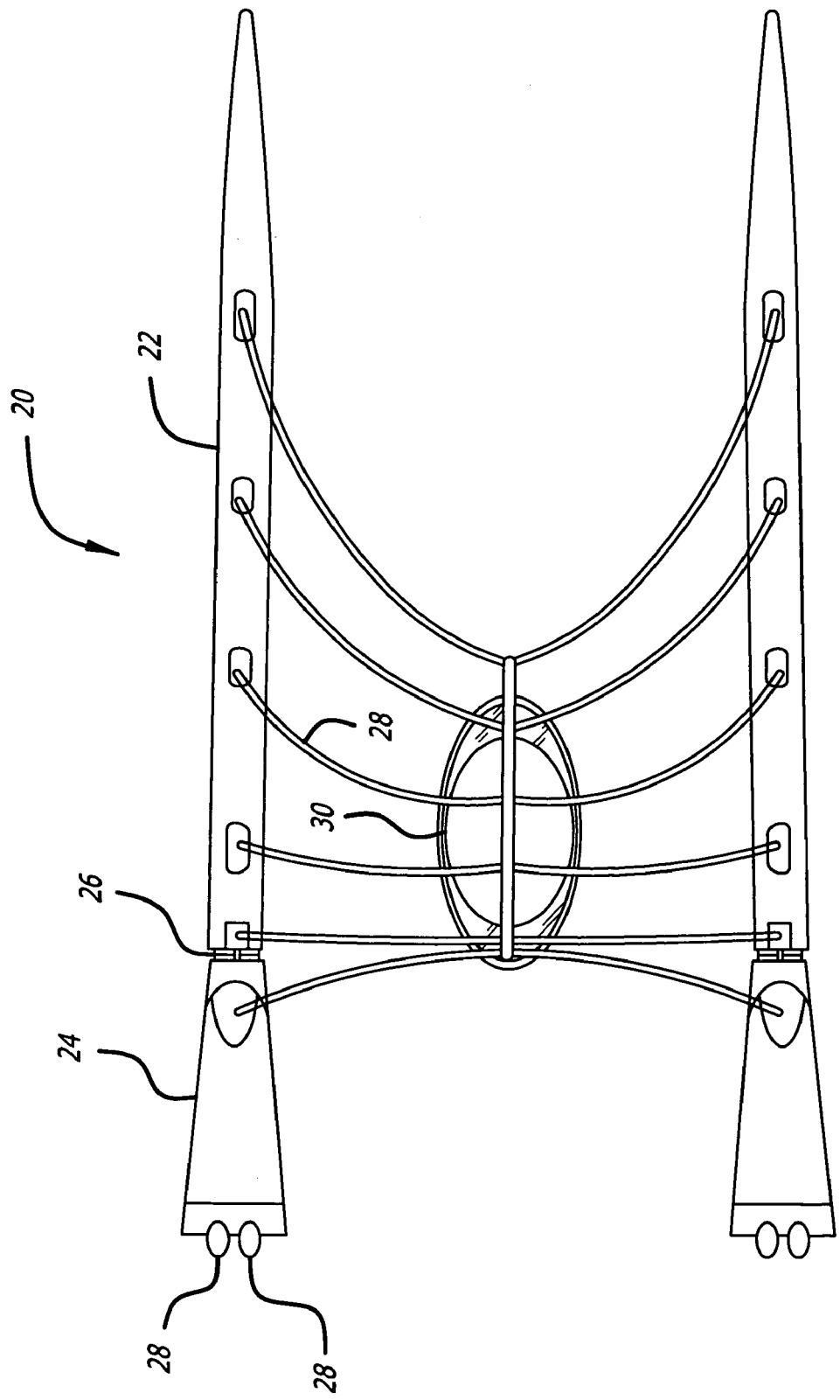

Disclosed herein are various improvements which may be practiced alone or in various combinations in vessels that otherwise may be generally in accordance with U.S. Pat. No. 6,874,439, the disclosure of which is hereby incorporated herein by reference. For reference, FIGS. 1A through 1C of that patent are reproduced herein as FIGS. 1A through 1C, and illustrate certain features common to some of the improvements disclosed herein. As shown in those Figures, there are two hulls 20, each having a forward hull section 22 and an aft hull section 24. The aft sections are hinged about an approximately horizontal axis by hinges 26 to a respective forward hull section. Propulsion is normally provided in the aft hull section 24, FIGS. 1A and 1B showing outboard engines 28 being used, though inboard engines may also be used if desired. The forward hull 22 sections are inflatable, normally comprised of a number of individually sealed compartments, with the aft hull sections 24 being rigid, or at least only partially inflatable, so as to have the required structure for support of the engines. Supported above the water on legs 28 attached to the hulls is a cabin 30. When at rest, the hulls float, supporting the cabin, and in operation, particularly high speed operation, the hulls may rise out of the water and skim along the water surface, the hinged propulsion pods assuring that the propellers (or water jet intakes, if used) remain in the water.

Flexible Ocean-Going Vessels with Retractable Legs

Figure 2:
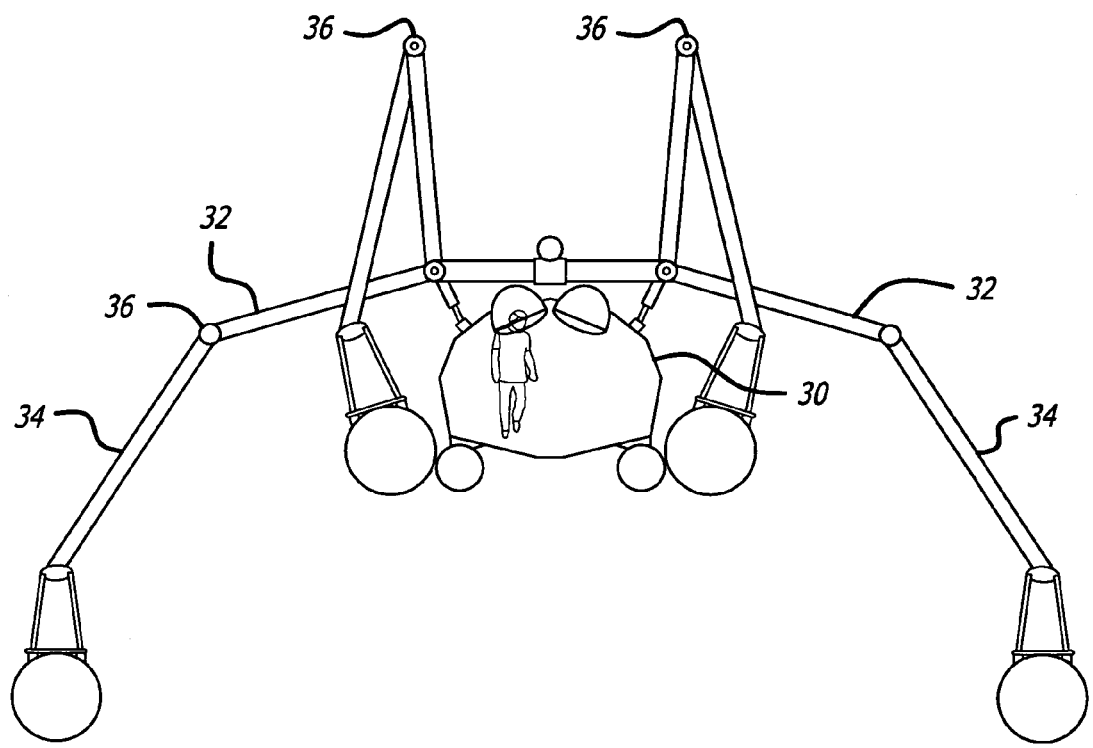
FIGS. 2 through 4 illustrate an embodiment of a flexible ocean-going vessel with retractable legs.
Figure 3:
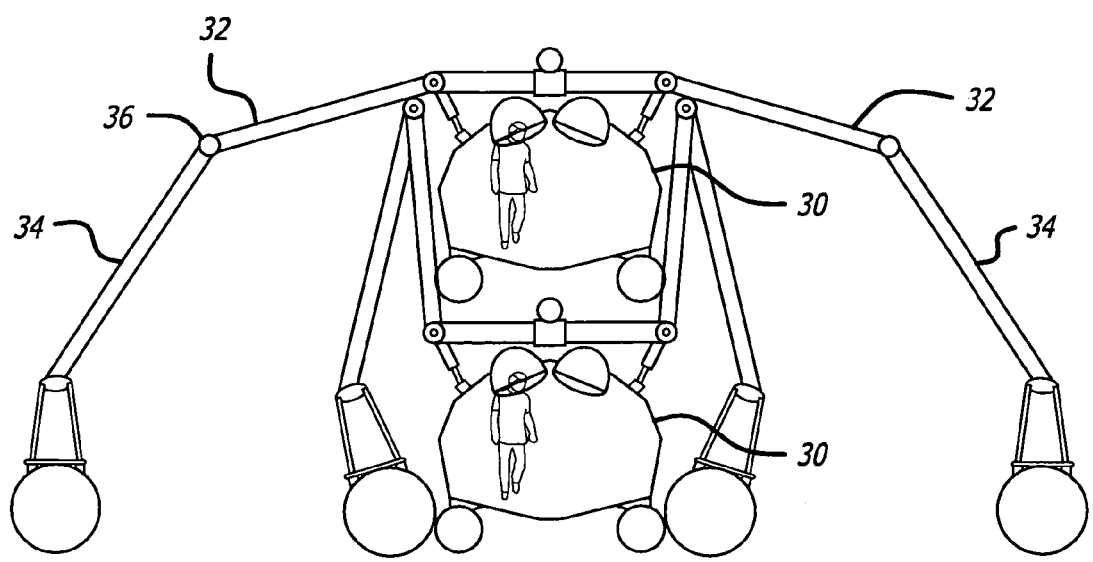
Figure 4:
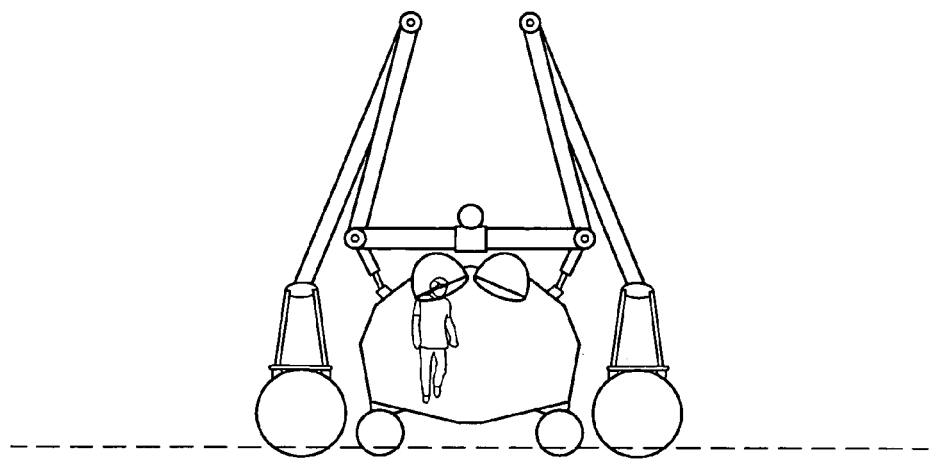

This embodiment is shown in FIGS. 2 through 4. As shown therein, the cabin 30 is supported from the hulls by relatively rigid legs, preferably two on each side of the vessel, each pair displaced fore and aft with respect to each other, though all preferably coupled to the forward hull section only. The relatively rigid part of each of the legs of the supporting structure is divided into sections (2 or more) 32 and 34 that are jointed together with rotational joints 36 that allow one degree of freedom of rotational movement. FIGS. 2 and 3 each show the extended (sailing) and retracted configurations that the rotational joints will allow for exemplary two section legs 32 and 34. FIG. 4 shows an alternative retracted configuration for the two section, double articulated legs. At least two legs (fore and aft legs) would be used from each forward hull section to the cabin, though a greater number could be used if desired. By controlling this rotation through mechanical means, such as by simple hydraulic pistons, the leg structure can be folded to lower the payload (cabin for example) to the water level for loading, unloading and even detachment for local use such as a shore vessel.

The advantages of this embodiment include:

1. The payload can be lowered to water level automatically at the press of a button by simple, available techniques.

2. Even without detaching the cabin, the width of the entire vessel is much reduced for ease of docking and/or passage in restricted waters.

3. Entry-exit to the cabin from a dock or from another vessel is much easier compared to the need to climb on a leg if the cabin is high on the structure.

Figure 5:
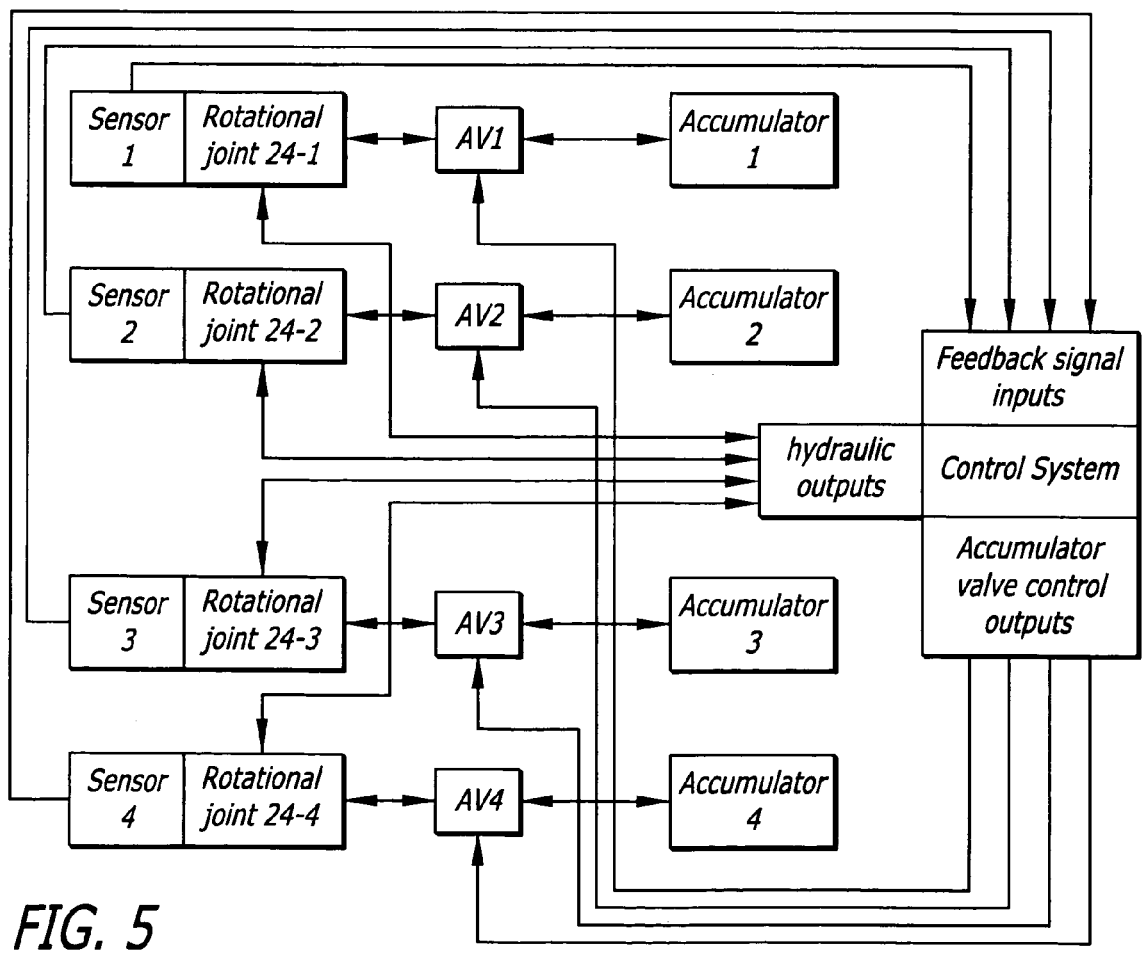
FIG. 5 is a block diagram of a control system for the flexible ocean-going vessel of FIGS. 2 through 4.

In another embodiment shown in FIG. 5, a control system for a hydraulic cylinder bending mechanism at the rotational joints 24 (other actuators may be used if desired) for a four legged design is shown. In this Figure, the rotational joints 24-1 through 24-4 are controlled using feedback from sensors 1 to 4 to establish a variable amount of flexibility to the entire leg structure to adjust for different sea conditions. This control system can also reduce or eliminate most of the motion of the cabin (payload), and to keep the cabin horizontal, or to even lean into a turn for improved comfort of passengers and/or to help avoid shifting of cargo. Such a system might use active feedback, and/or make use of hydraulic accumulators 1 through 4 to absorb energy from each deflection for return to the suspension system. In that regard, the "rigid" legs are rigid relative to the inflatable forward hulls, but can provide a certain degree of elasticity to absorb shock and vibration. As shown in FIG. 5, controllable valves AV1 through AV4 may be used to variably throttle the hydraulic flow to and from the accumulators to provide adjustable stiffness and to provide damping.

Flexible Ocean-Going Vessels with Aerodynamic Lift

Figure 6:
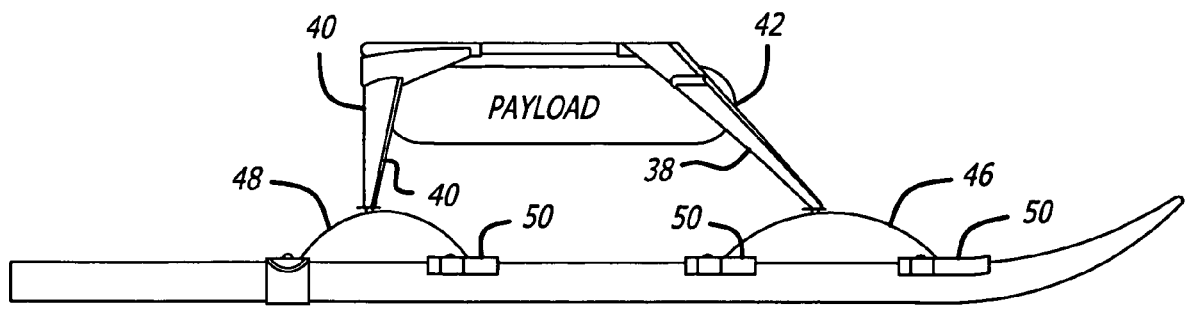
FIGS. 6 through 8 illustrate the application of aerodynamic lift surfaces to the rigid structure of flexible vessels in accordance with the present invention.
Figure 7:
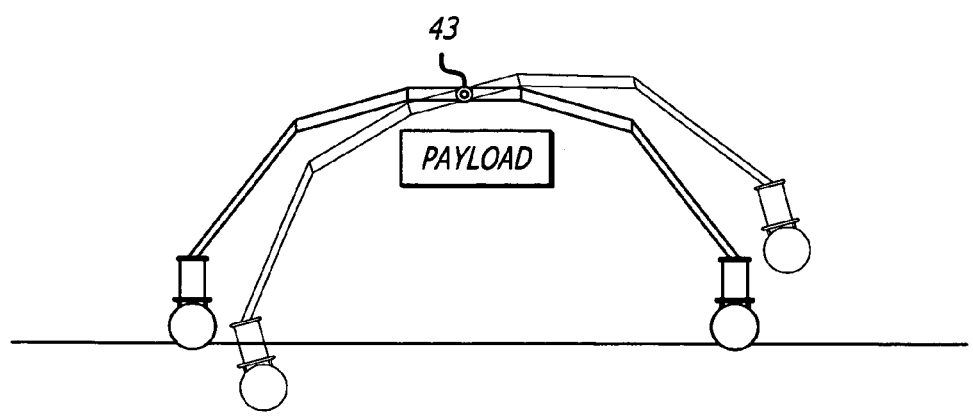
Figure 8:
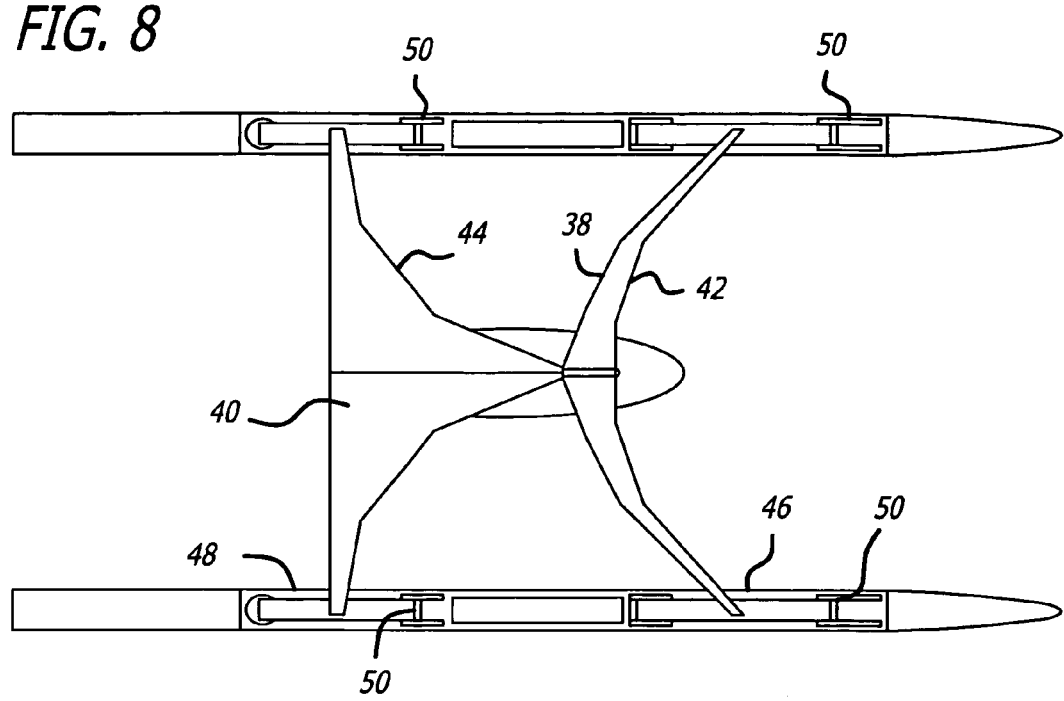

Aerodynamic lift surfaces (wings, horizontal sails) can be added to the rigid structure of the flexible vessel, as shown in FIGS. 6 through 8. In these Figures, forward 38 and aft 40 aerodynamic surfaces are shown connected to forward and aft legs 42 and 44. These surfaces can be fixed or controllable, flexible as in sailcloth or rigid, and can perform various function, including the following:

1. By positioning surfaces at the rear of the vessel, the lifting effect of these surfaces at the stern can counterbalance the tendency of the vessel to lift the bow during high speed into head winds, thereby reducing the vessel pitching and reducing the risk of pitch poling. The hinged motor pods will insure that the propulsion system stays in the water when some of the weight of the vessel is counterbalanced by the lift.

2. If the lifting surfaces are sufficiently large with respect to the size and weight of the vessel, substantial lift can be obtained at high speed. This will reduce the drag of the submerged areas and increase the maximum speed obtainable. By using this lift in a controlled way, the pilot can "fly" the updrafts present around large ocean waves.

The embodiment shown in FIGS. 6 through 8 uses four legs to connect the inflatable hulls and to carry the payload. The forward legs have an aerodynamic profile that provides negative lift to prevent lifting of the bows of the forward hulls in case of strong head winds and/or at high speed. Preferably this lift is equal to or larger than the weight of the forward hull sections themselves, or at least greater than the positive lift the forward hull sections would create when their forward regions become momentarily airborne, i.e., provide a net bow down force even when the forward regions of the forward hulls become momentarily airborne. If controllable aerodynamic lift surfaces are used, that is, the lift generated by the aerodynamic surfaces is controllable, normally minimal drag from these surfaces may be achieved, yet the desired negative lift may also be achieved when needed.

The stern legs preferably have a larger aerodynamic profile to provide positive lift. In case of head winds and waves, during vessel pitching, these surfaces will provide lift of the stern, thereby reducing the pitching and allowing for a more level travel through the head seas. If controllable aerodynamic lift surfaces are used, normally minimal drag from these surfaces may be achieved, yet the desired positive lift may also achieved when needed.

Figure 7A:
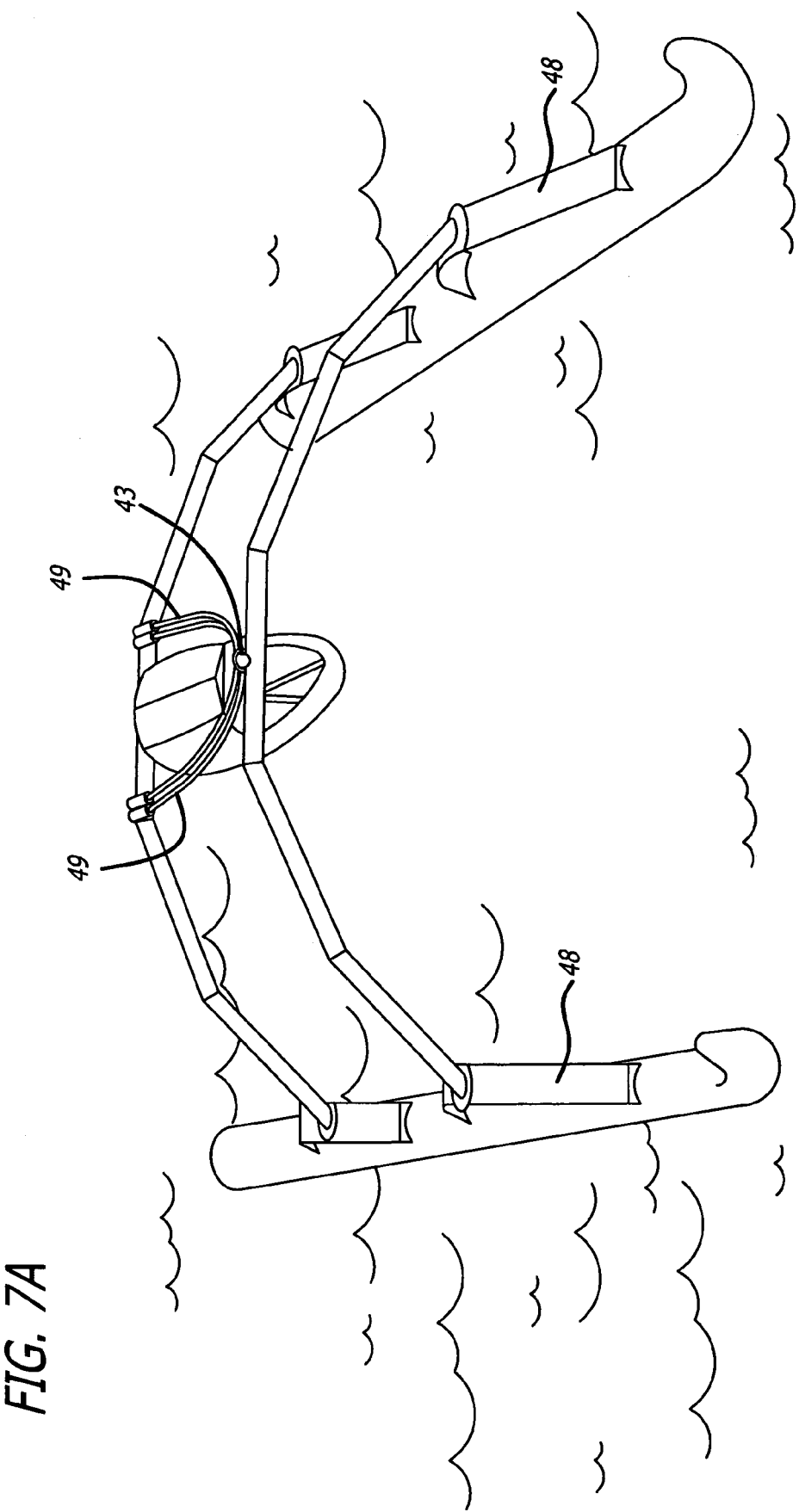

Note also in this embodiment that the forward leg pair is coupled to the stern legs through a ball joint 43, allowing the forward portion of the forward hull sections to follow the wave surfaces and not forcing the forward hull sections to remain substantially parallel to each other. As a further alternative, both leg pairs could be coupled to the cabin 30 (payload) though longitudinal pivots or flexures, allowing both the forward portion and the aft portion of the forward hull sections to follow the wave surfaces without a corresponding rotation of cabin 30, perhaps with some spring force encouraging the cabin to seek a position corresponding to the average forward hull section orientation. In that regard, the cabin in preferred embodiments does not form the structure connecting the forward legs to the stern legs, but rather that structure is preferably separately provided, as may be seen by the structure 49 in FIG. 7a. Also note that the word cabin is used in the most general sense herein, as it may be simply a cargo region, or even simply a navigation module for remote or self control. While the cabin could be structural, it is preferred that the separate structure be provided to facilitate such things as the easy removal and replacement of the cabin with a similar or different cabin.

Flexible Ocean-Going Vessels with Longitudinal and Transversal Hinges

Figure 9:
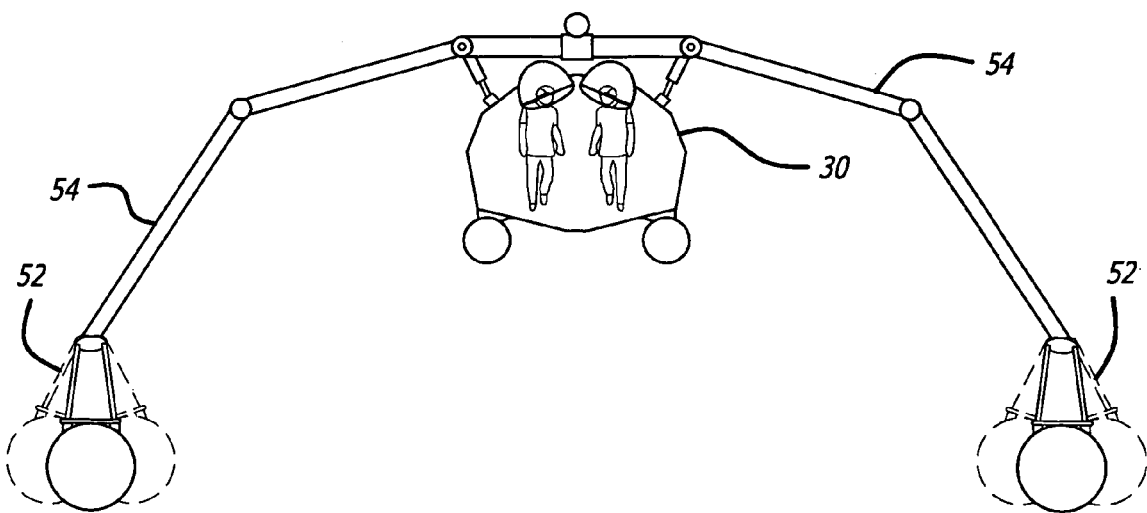
FIGS. 9 and 10 illustrate an exemplary flexible ocean-going vessel with longitudinal and transversal hinges in the form of cantilevered springs.
Figure 10A:
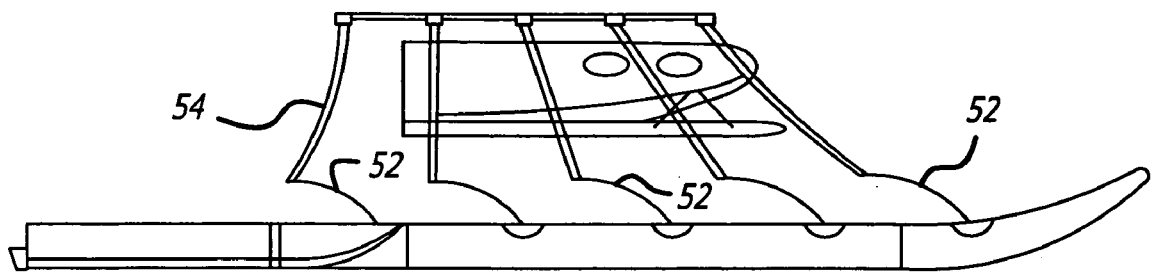
Figure 10B:
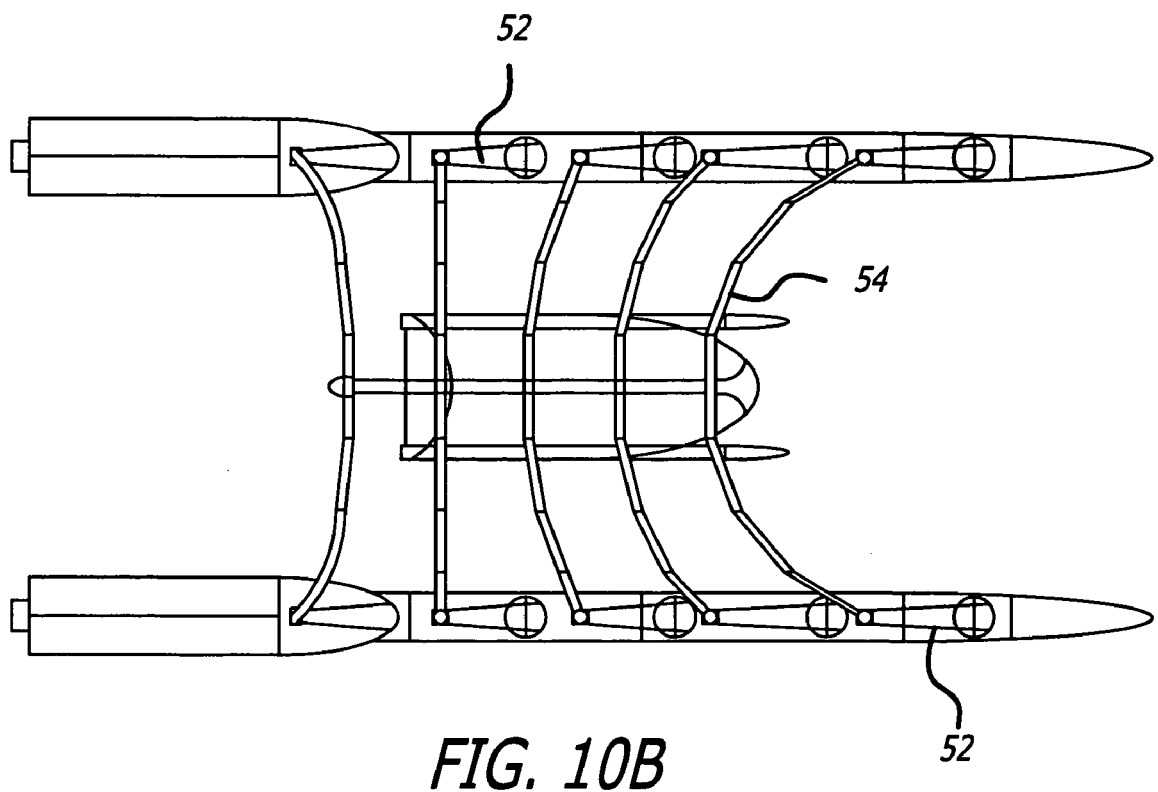

FIGS. 6 through 8 show one such embodiment, and FIGS. 9 and 10 show another such embodiment. In the embodiment of FIGS. 6 though 8, legs 42 and 44 are coupled to the forward hull sections by springs 46 and 48. The aft ends of aft springs 48 are coupled to the forward hull sections through a connection allowing pivoting but not fore and aft movement of the spring ends, with the other ends of the aft springs and both ends of the forward springs 46 resting on slide assemblies 50 so as to move longitudinally with respect to the hull sections, as necessary, to allow the forward hull sections to assume non-parallel relationships as required for each to follow the water surface. In the embodiment of FIGS. 9 and 10, cantilevered springs 52 are used. In this embodiment, any fore and aft movement of the spring ends may be absorbed by the elasticity of the legs. In that regard, the springs may be rigidly fastened to the leg ends, or to a rigid longitudinal member fastened to and running longitudinally along the forward hull sections, or both. Note that generally, when a rigid member is fastened to the inflatable section, extra layers of fabric may be used to reinforce the junction between the rigid member and the inflatable section, as is well known in the inflatable boat art.

In these embodiments, the flexible ocean-going vessel incorporates two elements of flexibility:

1. Flexible inflatable hulls.

2. Flexible structure that connects the hulls and carries the payload. The flexibility of the structure is achieved by means of flexible elements (springs) that can bend under load.

A novel element of this connecting structure is the addition of a number of hinges or pivot points that allow the springs to flex in a more natural way in the desired direction (up/down motion of the hulls in a sea way), without allowing sideways motion of the hulls. The sideways motion of the hulls would create additional hydrodynamic drag and cause additional motion at the payload.

There are two types of pivot points:

1. Transversal, at the joints of the springs to the hulls and to the structure.

2. Longitudinal, where the pair of legs joins at the center of the structure.

Again, FIGS. 9 and 10 show a possible embodiment of this invention. In this case, there are 5 pairs of legs 54, each connected to the hulls by means of springs 52 that terminate at the hull with a transversal pivot point. In addition, each pair of legs 54 may be free to rotate freely around a central structure shaft. This allows the hulls to be at an angle to each other, thereby following the sea surface.

Each pair of legs 54 may be comprised of a rigid structure that terminates at each end with two flexible spring systems that are attached to the inflatable hulls by means of transversal pivot points. Each rigid leg pair structure may have in the center a bearing that rotates on the longitudinal shaft.

These embodiments allow the leg pairs to move independently with respect to each other to allow the hulls to conform better to the sea surface. This freedom of movement is in addition to the movement allowed by the flexible elements of the legs.

In the embodiment of FIGS. 6 through 8, the cabin 30 hangs from the leg structure by three points. Two points are on the stern leg pair and one is on the foremost point of the longitudinal shaft.

Thus in the specific embodiment shown in FIGS. 6 through 8, the structure is made of only four legs 42 and 44 (two pairs). Each leg is connected to the inflatable hulls by a leaf spring made of one or more flat beams (analog to conventional truck leaf springs). In order to bend freely, these springs are attached to the hull and to the structure by hinges (transversal pivot points). The stern-most spring to hull hinge is fixed longitudinally while all the others are free to move longitudinally by means of slides. In addition, in this specific embodiment, the forward pair of legs 42 are connected by the stern pair of legs 44 by a ball joint 43. This gives the entire leg structure the maximum degree of freedom without compromising the integrity of the structure. Thus this system of pivot points and of slides allows maximum flexibility of the vessel's structure, making the vessel less subject to structural stresses in the high seas.

Fuel/Water Storage System for Vessels with Inflatable Structures

If a vessel has hulls that are made as an inflatable structure like the flexible vessels of U.S. Pat. No. 6,874,439, or has part of the hull made as an inflatable structure as in the RIBs (rigid inflatable boats), there is an opportunity to easily incorporate diesel fuel/water tanks in the inflatable structures in accordance with this embodiment. In particular, this embodiment of the invention relates to a method for installing a complete diesel fuel/water tank system into a preexisting inflatable structure with minimal work needed to the fabric of the structure, and/or for changing the diesel fuel/water tank or its size once installed.

It is evident that such tank systems can be built directly in the fabric system. However this method has the disadvantage of making the design and implementation of the inflatable structure with integral tanks rather complex, and the tank system cannot be changed as the vessel range requirements change. Also, repairs to the tanks would be difficult and would require extensive damage to the inflatable structure.

Flexible bladder tanks for diesel fuel or water are commercially available in a great variety of shapes and capacities. In accordance with the present embodiment, a tank of this type is chosen or fabricated to fit suitably within the inflatable structure in which it is to be installed. The fill and the outlet tubes are connected with flexible hoses to a plate that is formed or bent to conform to the curve of the inflated structure. A hole of the required dimensions is cut into the inflatable structure fabric and a ring or open frame of plastic or metal is inserted in the hole such that it reinforces the edge of the hole and supplies a base into which the plate attached to the flexible tank can be fastened. A gasket insures that the joint between the ring and the plate is airtight. The tank can be installed or removed by rolling it up empty and passing it through the hole in the fabric with the inflatable structure deflated, or particularly in the case of an elongate tank, by feeding it longitudinally through the hole in the fabric with at least each part being collapsed as it is passed through the hole.

Figure 11:
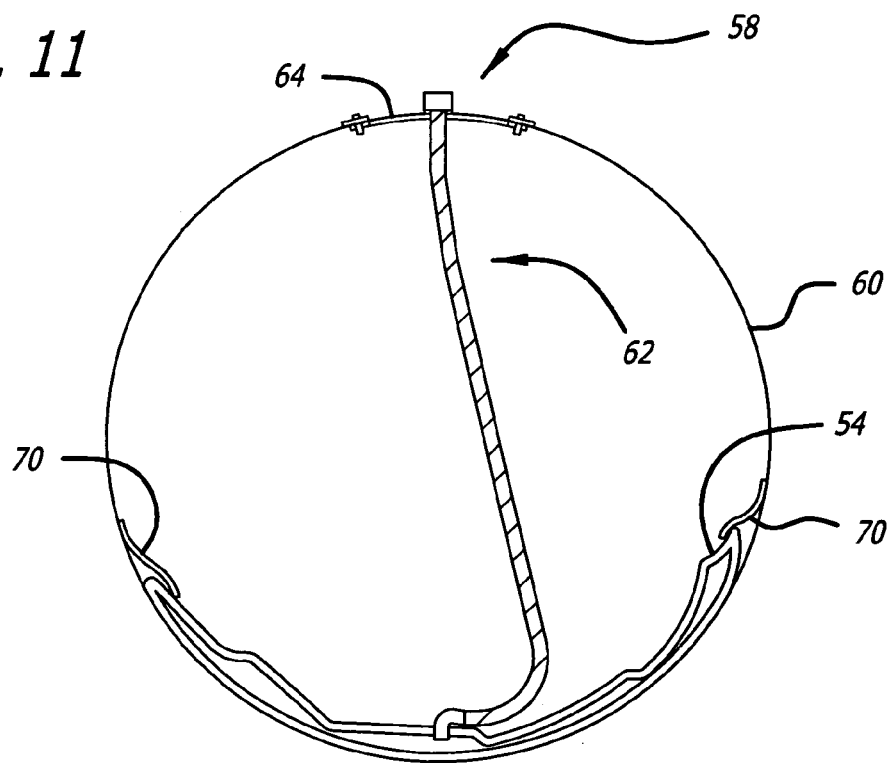
FIGS. 11 through 15 illustrate an exemplary fuel/water storage system for vessels with inflatable structures.
Figure 12:
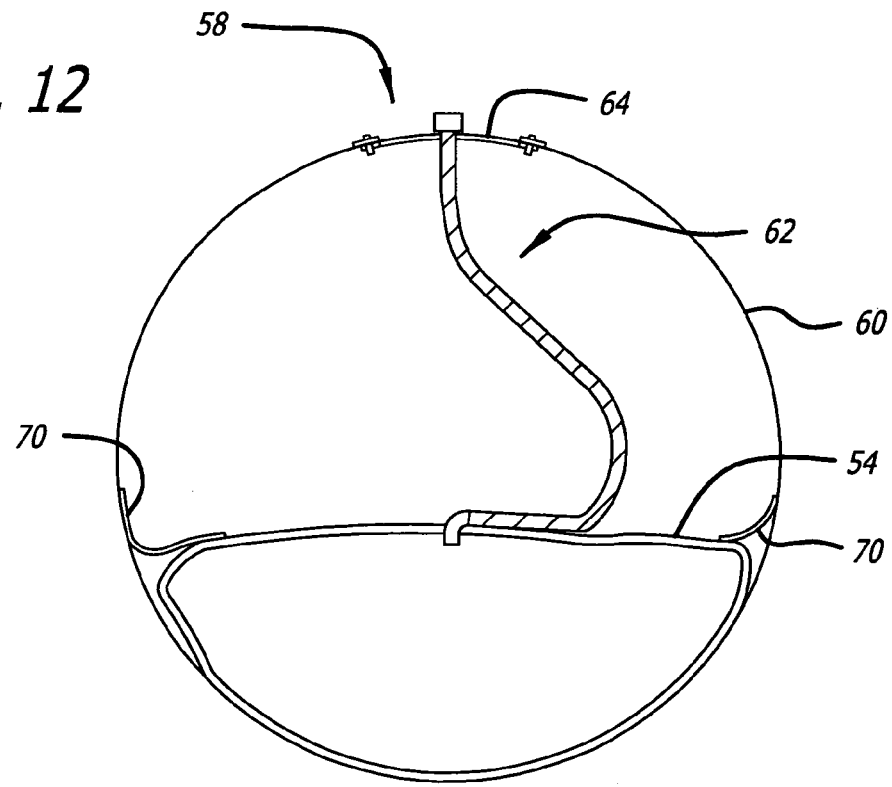

More particularly, FIGS. 11 and 12 show a typical embodiment of the invention after installation. For installation, a flexible fuel or water tank 54 is inserted through a hole, generally indicated by the numeral 58, in the inflatable hull or tube 60 and laid at the bottom of the tube where it can be secured by various methods. A hose assembly 62 connects the tank 54 to the mounting plate 64 that fits underneath the reinforced hole in the tube 60. This plate and the corresponding hole are preferably elliptical, though other shapes may be used provided the mounting plate can be passed through the hole 58 in tube 60 and reoriented to fully underlay and circumscribe the inner edge region of the hole 58 so as to ultimately secure and reinforce the hole opening and to insure an airtight seal. The length of the hose assembly 62 is chosen to accommodate the change in shape of the tank 54 from empty to full.

Figure 13:
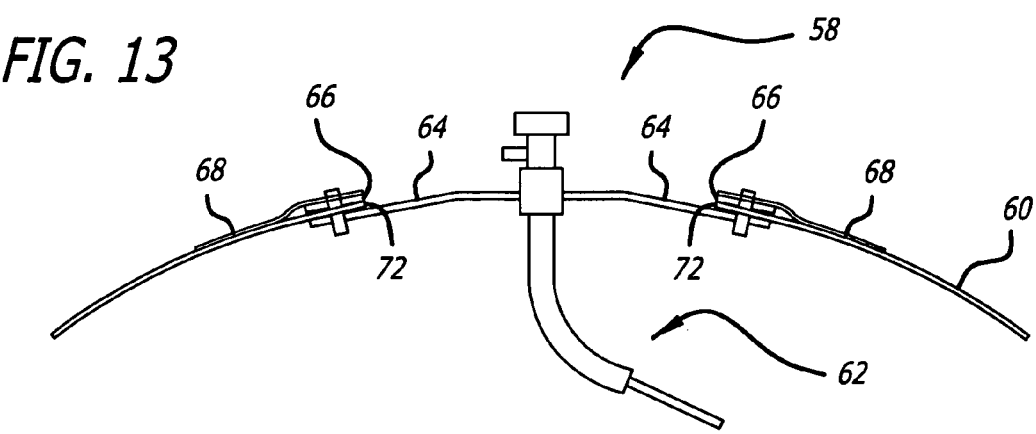
Figure 14:
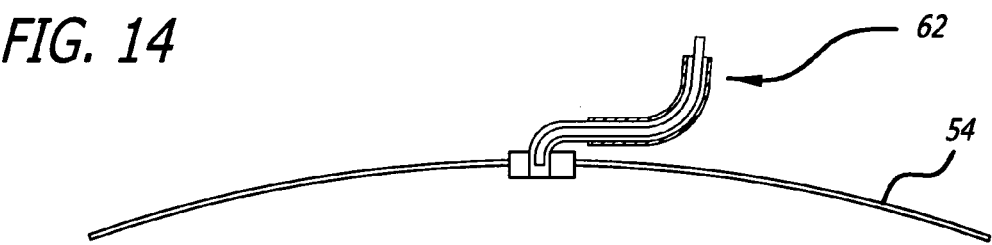
Figure 15:
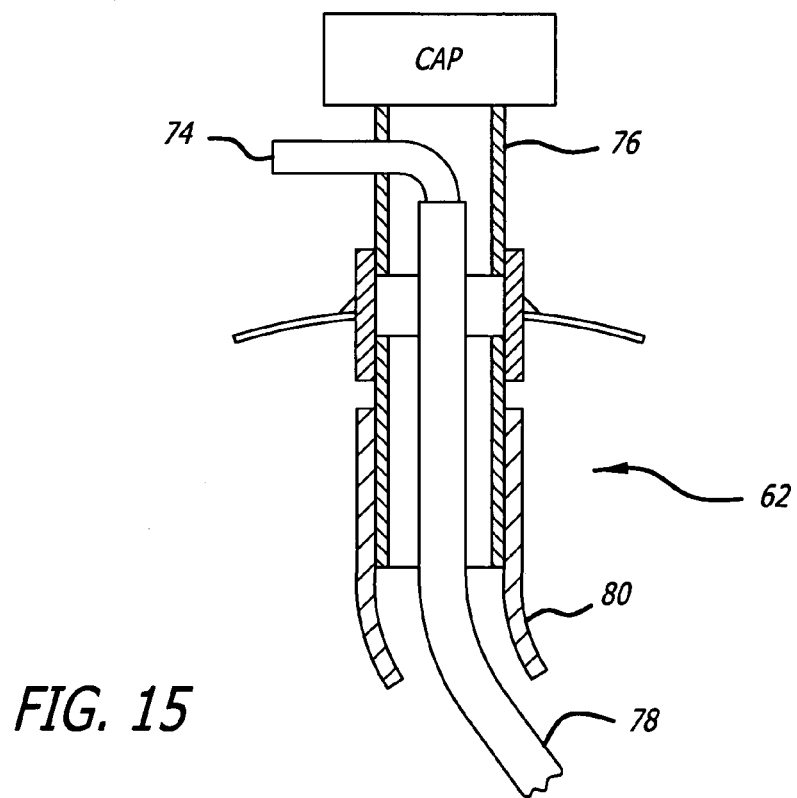

FIGS. 13, 14 and 15 illustrate details of the mounting plate 64 and of a possible fill and discharge tube assembly 62, respectively. A preferred procedure to install the tank 54 inside an existing inflatable structure 60 is as follows:

1. A metal or plastic open frame 66 is glued to the surface of the tube 60 while the tube is inflated at operational pressure. One or more rings of reinforcing fabric 68 are then glued on top of the open frame and over the surrounding fabric. This assembly has to be strong enough to suitably distribute the inflation loads. Preferably the open frame has an elliptical shape, but other shapes such as generally rectangular could be used, provided that a plate with a similarly shaped periphery will pass through the ring when properly oriented to do so.

2. Opening 58 is then cut in the tube 60 following the opening in the metal frame (note that in some cases this ring can be made of plastic). At this point, the tube 60 is completely deflated, and there is access to the inside of the tube. Now tank anchor points or straps 70 (FIGS. 11 and 12) may be cemented in appropriate locations within the tube 60 dependent on the size and configuration of the tank 54 used. Additional reinforcing may also be put in place within the tube if needed, or could be added externally to the tube, preferably once the tank is fully installed and the tube perhaps at least partially re-inflated.

3. The tank 54 with the hose assembly 62 and the mounting plate 64 already connected is then inserted through the opening and positioned inside the tube 60. The tank 54 s secured to the inside surface of the tube 60 with lashings or the straps 70 previously put in place. Alternatively, if the tank is an elongate tank it could be collapsed locally and fed progressively through the opening in the tube. The lashings or tie-downs should be disposed to accommodate and secure the tank when full, empty or somewhere in-between without interfering with the tank capacity or stressing the tube or tank.

4The elliptical or other shaped mounting plate 64 fastened to the tank 54 is inserted sideways through the hole 58, turned and fastened to the open frame 66 with bolts that screw into blind rivet nuts. A good seal is provided by a gasket 72 placed between plate and ring, with an additional layer of material 68 providing additional reinforcing.

5. The tube is re-pressurized and the tank can be connected with suitable plumbing to the fuel/water system of the vessel.

FIG. 14 also illustrates a possible system for filling and discharging the contents of the tank 54 that requires only one opening in the tank and one neck welded to the mounting plate 64. Further with reference to FIG. 15, a discharge outlet 74 is welded to the fill tube 76. This outlet has an elbow internal to the fill neck. A hose 78 of small diameter in comparison to the diameter of the fill hose 80 is connected to the elbow and threaded inside the fill hose so that it reaches the top of the tank.

The advantage of the described hose assembly 62 is that after filling of the tank 54 (to be done with minimal air pressure in the tube or respective compartment in the tube 60), upon opening of the discharge valve, the liquid will reach the discharge tube first and an air bubble will remain at the top of the fill tube. This will help to minimize the danger of fuel spills.

An alternate method is to use two separate connectors for filling and discharging. In this case, two tubes will connect the tank with the mounting plate. The mounting plate in this case will have two separate ports for filling and discharging.

One of the advantages of this method of storing fuel/water is that the air pressure inside the inflated tube will automatically allow, by means of control valves, transfer of fuel between the flexible tank and the vessel standard tanks. If multiple tanks are installed in an inflated hull in separate compartments, the transfer of fuel between tanks can be achieved by controlling the air pressure in the compartments. In the case of a large inflatable vessel like the inflatable catamaran, this transfer of fuel can be used to control the loading along the hulls as the fuel is used or the payload is changed.

Modular Pressurization System for Large Inflatable Vessels

If the hull or hulls of a vessel of more than 50 feet in length are made entirely or substantially entirely of inflated, fabric reinforced elastomer, it is necessary to have a system to control the pressure of the various inflated compartments independently. The main reason for this is that such a vessel relies entirely on the pressure for its sea keeping capabilities. For example, in the case of heavy weather and breaking waves, it may be necessary to decrease the pressure of the forward compartments in order to render the hulls more flexible, thereby reducing the stresses on the structure that holds the hulls together. Conversely, if the sea is calm, it is advantageous to inflate the hulls to the maximum allowable pressure to obtain the best hydrodynamic performance. Such sophisticated pressurization and depressurization system is clearly not necessary for vessels that use the inflated part mainly for safety, stability and as protection fenders as in modern RIBS (rigid hull inflatable).

It is desirable that the inflating system be modular because a central compressor would be distant from the inlets to each separate compartment of the hull and the connecting long tubing system would be complicated to deploy and subject to easy breakage given the relative motions in a vessel where the flexibility of the various structural members is a design characteristic of such vessels. Moreover, in the case of a pump or valve failure, there is the risk that large amounts of air will be lost and that the integrity of the entire vessel will be compromised. To repair such a system may be cumbersome and even impossible in heavy seas.

In the present invention, the modularity of the pump/valve system reduces the piping to the barest minimum and allows for easy replacement of a damaged module. It also provides the most efficient use of the pump output and maximizes the pumping rate by minimizing the energy loss that otherwise would be dissipated in the piping if long runs were used between a pump and an inflated compartment.

In particular, this embodiment provides modular pressure control systems for large inflatable vessels that are deployed near each independent inflatable compartment of the vessels. Each modular system comprises an air pump that can reach the maximum desired pressure, and one or two valves that are actuated electrically for increasing or decreasing the pressure of the compartment. The pressure of each compartment is monitored by a pressure sensor housed in the module. Each module operates and communicates to the vessel bridge by analog or digital means, wired or wireless. The entire system can be automated by means of a digital computer that can also display the various pressures and the status of the pumps and valves. When used together with the fuel/water storage system for vessels with inflatable structures hereinbefore described, the pressure control system may deflate an inflated compartment at a controlled rate and as required to make up for the volume of the compartment displaced by the filling of the flexible tank within the compartment, and to reinflate the compartment when and as required to maintain the desired pressure in the compartment as the contents of the flexible tank are removed. Further of course, there is a substantial expansion and contraction of air with changes in temperature, and accordingly a compartment inflated to the proper operating pressure on a bright sunny day would become under-inflated for operating under the same sea conditions at night, and if inflated to the proper operating pressure for operating at night, the compartment would be over-inflated for the same sea conditions during the day, and perhaps dangerously over-inflated. The present invention not only adds air to a compartment when needed, but also removes air from a compartment when needed.

Figure 16:
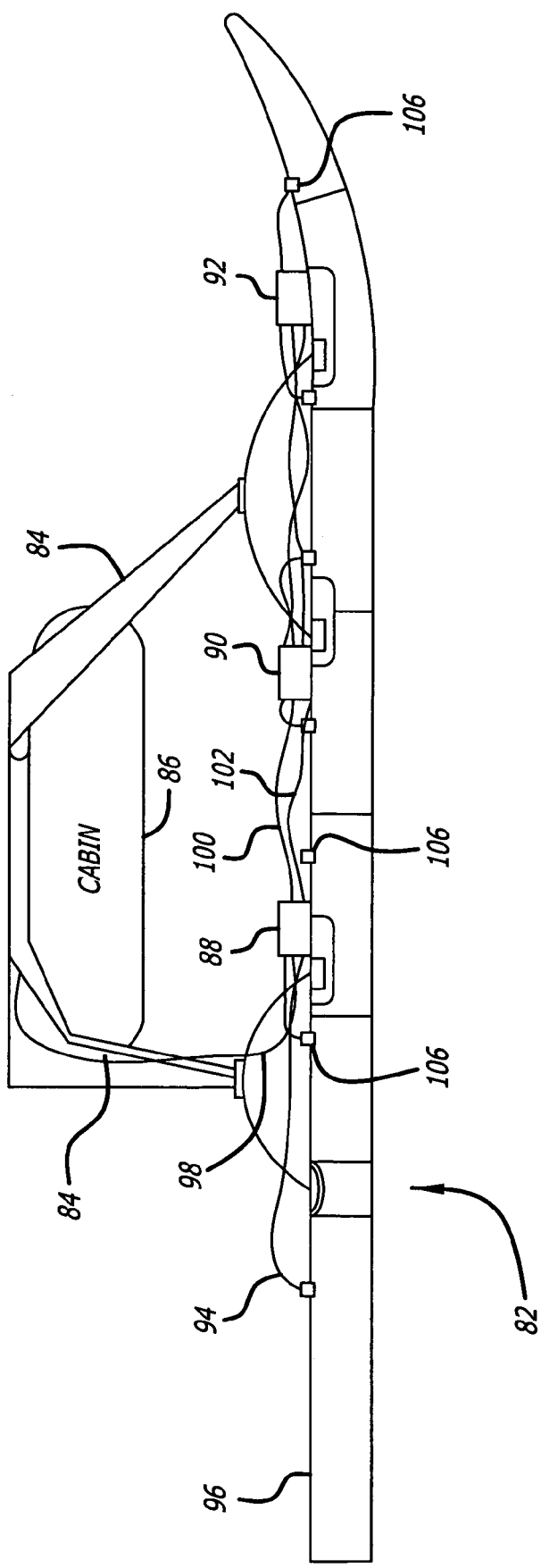
FIGS. 16 through 20 illustrate an exemplary modular pressurization system for large inflatable vessels.

FIG. 16 illustrates an inflatable vessel of the catamaran type generally in accordance with U.S. Pat. No. 6,874,439 and composed of two side-by-side hull assemblies 82 and a structure 84 connecting the hulls. The structure also holds a cabin 86 in its center. Each inflatable forward hull of this particular embodiment has six separate air compartments. There are three pressure control modules 88, 90 and 92 affixed to each hull by means of straps or other suitable system that permits the rapid and secure positioning of the modules in the proper position and also permits easy removal and replacement of the modules at sea in case of a module failure. In this embodiment of the invention, each module is connected to and controls two chambers to reduce the number of compressors and connecting cables. The modules may each be placed at or near the divider between adjacent compartments, as can the pressure sensors and other components connected to the compartments, so as to minimize electrical and compressor lines and in turn, minimize the opportunity for damage to the electrical and compressor lines.

The stern-most module 88 is connected with a power cable 94 to the power source housed in the motor pod compartment 96. This power can be AC or DC. A signal cable 98 carrying the control information from the cabin and the pressure information to the cabin is connected to module 88.

From module 88, a power cable 100 and a signal cable 102 connect to module 90. Identical cables connect module 90 with module 92. The fact that these cables are identical has the advantage of reducing the number of necessary spares. Also, preferably all signals and power are direct connected to all modules, with each module being able to be set so as to recognize only control signals directed to that module. That way, no module depends on the proper operation of another module, so that failure of a module such as module 88 does not effect the operation of modules 90 and 92. Of course, alternate forms of connection and interconnection may be used as desired.

Figure 17:
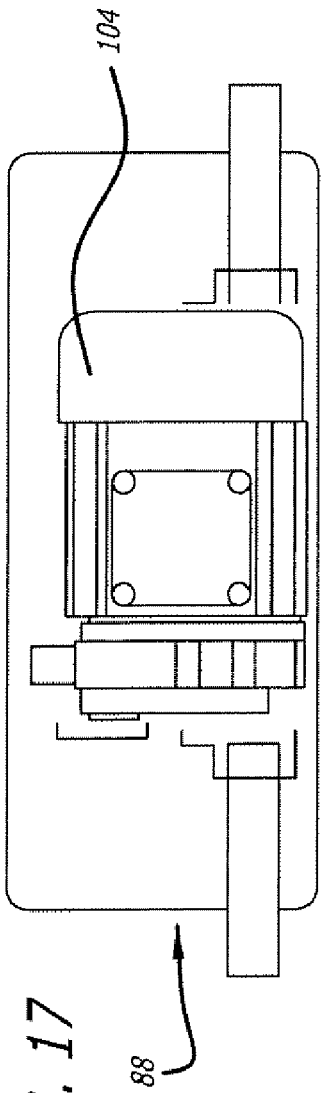
Figure 18:
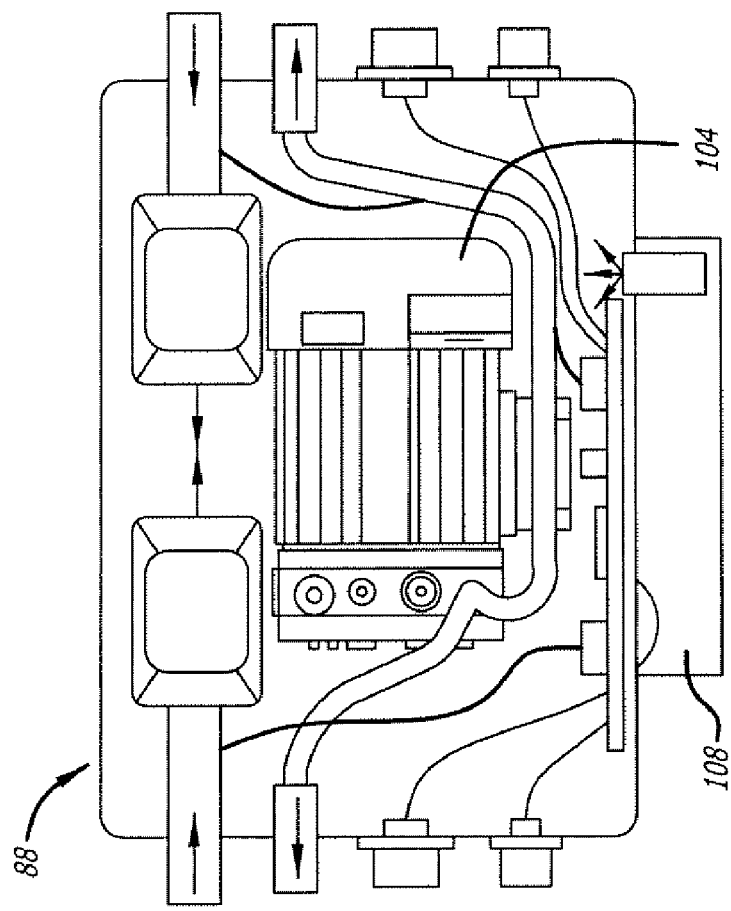
Figure 19:
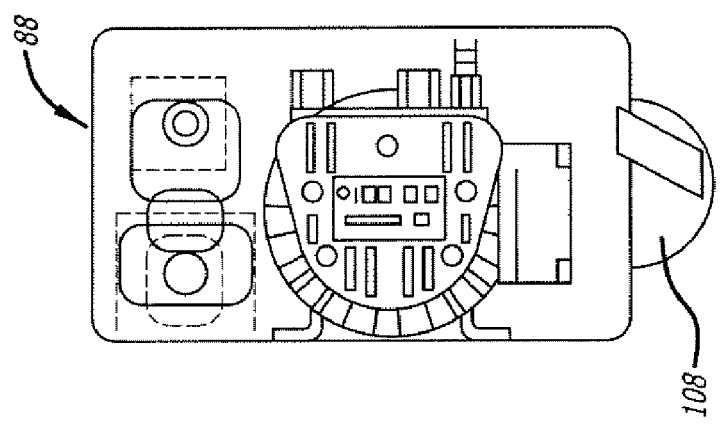

FIGS. 17, 18 and 19 illustrate more detail of an exemplary module 88, 90 or 92. FIG. 17 is a side view, FIG. 18 a top view and FIG. 19 a first end view of the exemplary module.

In this embodiment, compressor 104 is connected to two compartments (outlets A and B) through the standard inflation valves of the inflatable hulls. These valves can be set to be inflation only, thus preventing the two compartments from discharging into each other in the case of a differential pressure between the two compartments. In this embodiment, the actual pressure in each compartment is regulated by the deflating valves A and B. These valves are connected to the appropriate compartment through a connector that is always open, though an additional manual valve (not shown) can be added for safety.

Figure 20:
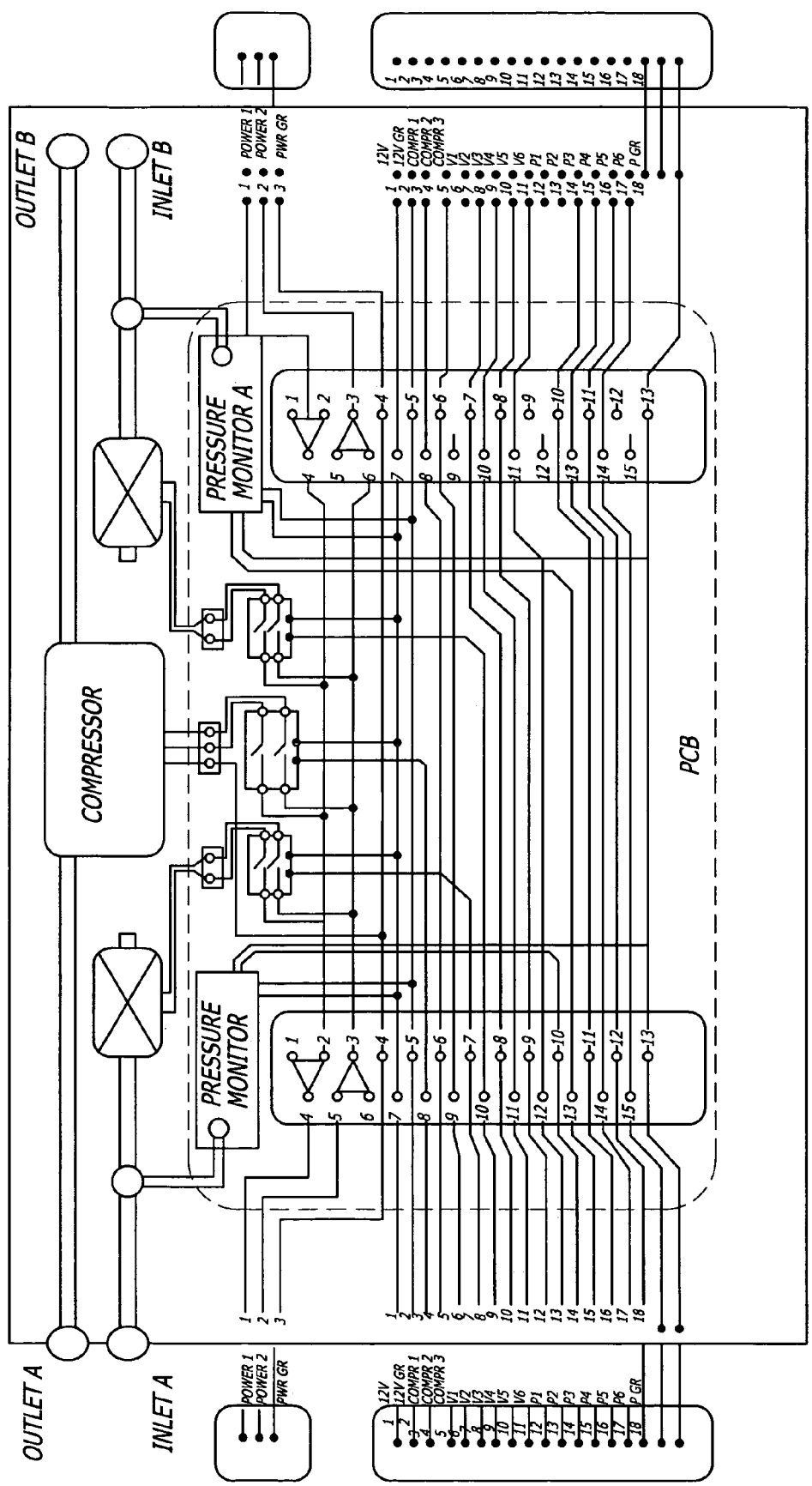

The compressor and the valves are powered through relays that are controlled from the cabin by means of manual or automatic switches. The pressure of each compartment is measured by means of a pressure sensor 106, with the pressure information being sent via the control cable 98 to the cabin 86 (FIG. 16). The pressure control system is housed in a waterproof enclosure, with an air/water separator 108 being installed on the side of the enclosure to exclude water from the inside of the housing during navigation. FIG. 20 shows in more detail an exemplary wiring diagram for the pressure control modules 88, 90 and 92. Waterproof connectors are used to enter the necessary wires into the housing. Separate connectors for power and signal are used to avoid EMI interference of the signal lines. The input and output electrical connectors are wired internally in such a way that the various modules are all identical and that they can be connected in a "daisy chain" mode. The compressor outlet is connected to outlet A and B. The deflating valves discharge air directly inside the housing for intake by the compressor and/or expulsion through the air/water separator.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of adding a flexible fuel tank within an inflatable hull of a watercraft comprising:
   a) inflating the inflatable hull
   b) gluing an open frame to the inflated hull;
   c) cutting away the portion of the inflatable hull circumscribed by the open frame;
   d) passing a flexible fuel tank having a hose assembly coupled between the flexible tank and a mounting plate through the opening in the open frame into the inflatable hull;
   e) passing the hose assembly and mounting plate through the open frame into the inflatable hull; and,
   f) reorienting the mounting plate relative to the open frame and connecting the mounting plate to the open frame.

2. The method of claim 1 further comprised of attaching hold down attachments to the inside of the inflatable hull after c) and attaching the flexible fuel tank to the hold down attachments after d), the hold down attachments and the attachment of the flexible fuel tank allowing filling and emptying of the fuel tank without distortion of the inflatable hull when inflated.

3. The method of claim 1 wherein the mounting plate includes a fill port and a discharge port.

4. The method of claim 1 wherein in f), inflatable hull material is sandwiched between the open frame and the mounting plate.

5. The method of claim 4 wherein the mounting plate and inflatable hull material are sealed.

6. A method of adding a flexible fuel tank within an inflatable hull of a watercraft comprising:
   a) gluing an open frame to the inflatable hull;
   b) cutting away the portion of the inflatable hull circumscribed by the open frame;
   c) passing a flexible fuel tank having a hose assembly coupled between the flexible tank and a mounting plate through the opening in the open frame into the inflatable hull;
   d) passing the hose assembly and mounting plate through the open frame into the inflatable hull; and,
   e) reorienting the mounting plate relative to the open frame and connecting the mounting plate to the open frame;
   wherein the inflatable hull has a plurality of separate inflatable compartments and a modular pressure control system comprising, for each two adjacent inflatable compartments:
   a pressure controller having:
      an air compressor coupled to each of the two adjacent inflatable compartments for supplying air to the inflatable compartments;
      a pressure sensor coupled to each of the two adjacent inflatable compartments for sensing pressure in each inflatable compartment; and,
      a deflation valve coupled to each of the two adjacent inflatable compartments for controllably allowing air to escape from each compartment responsive the an output of the respective pressure sensor;
   the air compressor and the deflation valves allowing the maintenance of desired pressures in the respective compartments.

7. The method of claim 6 wherein the inflatable hull has a plurality of pairs of separate inflatable compartments, and the modular pressure control system has a central pressure control station coupled to each pressure controller for receiving signals from and providing commands to each pressure controller.

8. The method of claim 6 wherein the pressure controllers are interchangeable and may be set to distinguish between commands to itself and other pressure controllers.

9. The method of claim 8 wherein the coupling of each pressure controller to the central pressure control station will be unaffected by the failure of another pressure controller.

10. A method of adding a flexible fuel tank within an inflatable hull comprising:
   a) gluing an open frame to the inflatable hull;
   b) cutting away the portion of the inflatable hull circumscribed by the open frame;

c) passing a flexible fuel tank having a hose assembly coupled between the flexible tank and a mounting plate though the opening in the open frame into the inflatable hull;

d) passing the hose assembly and mounting plate though the open frame into the inflatable hull; and, e) reorienting the mounting plate relative to the open frame and connecting the mounting plate to the open frame;

wherein the inflatable hull is part of a watercraft comprising:

first and second hulls; and, a module adapted to carry a load above a water surface;

the module being coupled to the first and second hulls by legs, each leg having at least two rotational joints therein allowing adjustment in the elevation of the module relative to the hulls and adjustment in the separation of the hulls.

11. The method of claim 10 wherein each hull has a forward hull section and an aft hull section, the aft hull sections each being flexibly coupled to the respective forward hull section, the module being coupled to the forward hull section.

12. The method of claim 11 wherein the forward hull sections are inflatable and the aft hull sections each include a source of propulsion.

13. The method of claim 10 wherein the number of legs coupled between the module and each hull is two.

14. The method of claim 10 further comprising a control system coupled to the rotational joints to control the angle and response of the rotational joints.

15. A method of adding a flexible fuel tank within an inflatable hull comprising:

a) gluing an open frame to the inflatable hull;

b) cutting away the portion of the inflatable hull circumscribed by the open frame;

c) passing a flexible fuel tank having a hose assembly coupled between the flexible tank and a mounting plate through the opening in the open frame into the inflatable hull;

d) passing the hose assembly and mounting plate through the open frame into the inflatable hull; and, e) reorienting the mounting plate relative to the open frame and connecting the mounting plate to the open frame;

wherein the inflatable hull is part of a water craft having:

first and second hulls; and, a module adapted to carry a load above a water surface;

the module being coupled to the first and second hulls by legs, each leg having an aerodynamic lifting surface thereon for providing lift as the watercraft move thorough the water at high speed.

16. The method of claim 15 wherein each hull has a forward hull section and an aft hull section, the aft hull sections each being flexibly coupled to the respective forward hull section, the module being coupled to the forward hull section.

17. The method of claim 16 wherein the number of legs coupled between the module and each hull is two, each pair of legs to each hull being spaced apart in a forward and aft orientation.

18. The method of claim 17 wherein the lift generated by the aerodynamic surfaces on the forward legs is negative and the lift generated by the aerodynamic surfaces on the aft legs is positive.

19. The method of claim 16 wherein the lift of the aerodynamic surfaces is controllable.

20. A method of adding a flexible fuel tank within an inflatable hull comprising:

a) gluing an open frame to the inflatable hull;

b) cutting away the portion of the inflatable hull circumscribed by the open frame;

c) passing a flexible fuel tank having a hose assembly coupled between the flexible tank and a mounting plate through the opening in the open frame into the inflatable hull;

d) passing the hose assembly and mounting plate through the open frame into the inflatable hull; and, e) reorienting the mounting plate relative to the open frame and connecting the mounting plate to the open frame;

wherein the inflatable hull is part of a water craft having:

first and second hulls; and, a module adapted to carry a load above a water surface;

the module being coupled to legs, the legs being coupled to the first and second hulls by springs allowing hull motion relative to the legs.

21. The method of claim 20 wherein each hull has a forward hull section and an aft hull section, the aft hull sections each being flexibly coupled to the respective forward hull section, the springs being coupled to the forward hull section.

* * * * *